United States Patent [19]

Hirose

[11] Patent Number: 4,555,803
[45] Date of Patent: Nov. 26, 1985

[54] IMAGE INFORMATION FILING APPARATUS AND METHOD

[75] Inventor: Kenji Hirose, Yokohama, Japan

[73] Assignee: Tokyo Shibaura Denki Kabushiki Kaisha, Kawasaki, Japan

[21] Appl. No.: 480,272

[22] Filed: Mar. 30, 1983

[30] Foreign Application Priority Data

Apr. 2, 1982 [JP] Japan .................................. 54-55142

[51] Int. Cl.$^4$ ........................... G06K 9/00; G11B 7/00
[52] U.S. Cl. ..................................... 382/61; 358/335; 369/47; 382/1
[58] Field of Search .................................... 369/47–49, 369/59, 83, 93; 382/61, 1; 358/310–313, 335, 339, 342, 102, 903

[56] References Cited

U.S. PATENT DOCUMENTS

| 4,142,209 | 2/1979 | Hedlund | 369/47 |
| 4,404,683 | 9/1983 | Kobayashi et al. | 358/335 |
| 4,425,586 | 1/1984 | Miller | 358/335 |

Primary Examiner—Leo H. Boudreau
Attorney, Agent, or Firm—Cushman, Darby & Cushman

[57] ABSTRACT

An image information filing apparatus having a first storing medium with a finish data area. A recognition code is previously stored in the first storing medium. After the recognition code of the first storing medium has been written into a second data storing medium, finish data is written into the finish data area of the first storing medium. Both the finish data written into the first storing medium and the recognition code written into the second storing medium allow a one-to-one correspondence between the first and second storing mediums.

8 Claims, 6 Drawing Figures

F I G. 2
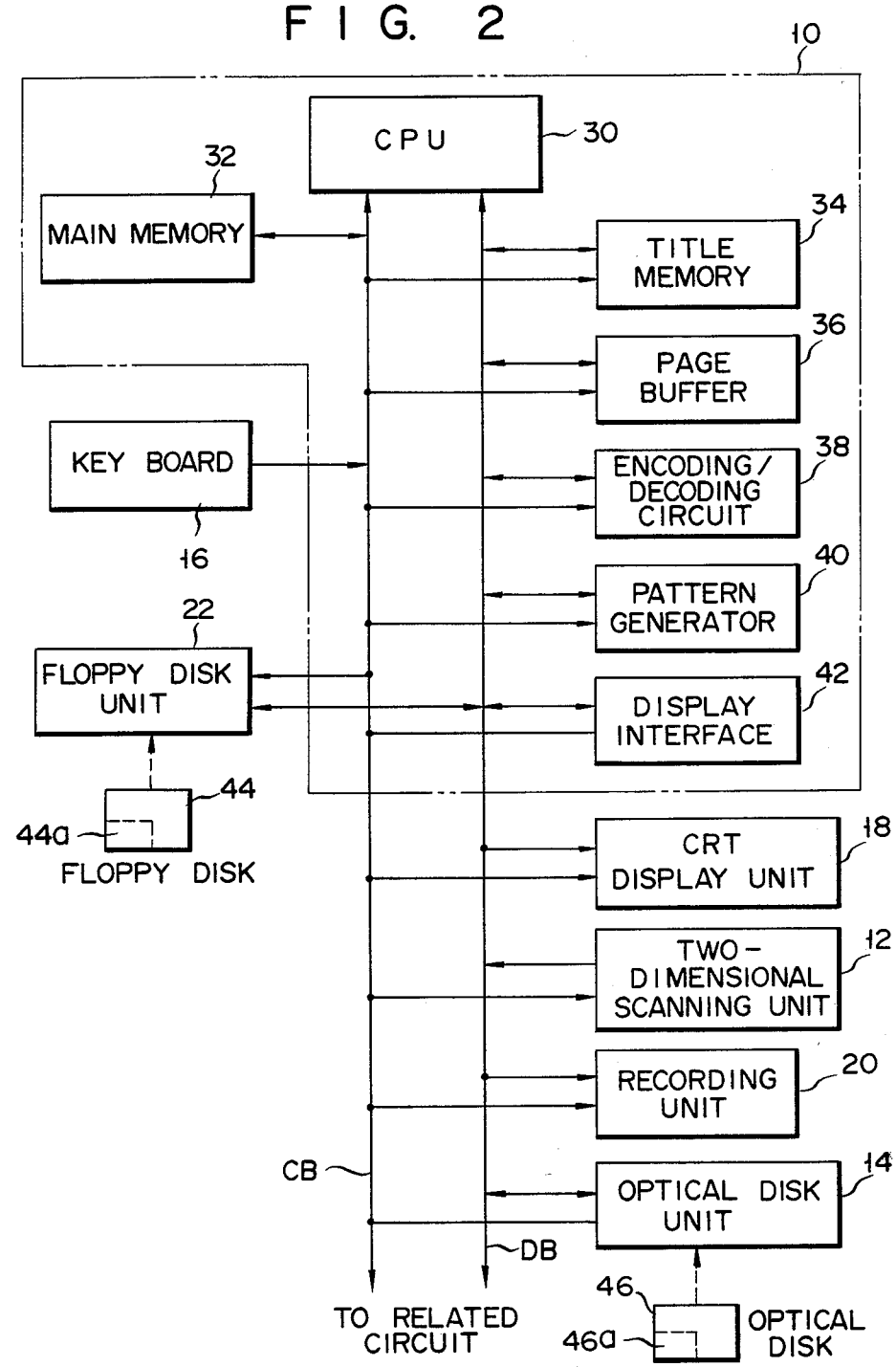

IMAGE INFORMATION FILING APPARATUS AND METHOD

BACKGROUND OF THE INVENTION

The present invention relates to an image information filing apparatus in which image information on a document, for example, is stored in a first storing medium, retrieval data assigned to each piece of the image information is stored into a second storing medium, and the image information stored in the first storing medium is retrieved and read out based on the retrieval data. The present invention particularly relates to an image information filing apparatus which can secure a one-to-one correspondence between a first storing medium and a second storing medium.

Recently, the following image information filing apparatus has been developed and made commercially available. The image information filing apparatus optically reads the image information of a document by a two-dimensional scanner, stores the image information on an optical disk, and stores the retrieval data assigned to each unit of the image information on a floppy disk. To retrieve the image information from the optical disk, the apparatus uses the retrieval data which indicates a location on the optical disk where the corresponding image information is stored. The image information thus read out is displayed on the screen of a CRT display unit or printed as hard copy by a recording unit.

In such an image information filing apparatus, a one-to-one correspondence between the optical disk and the floppy disk is typically achieved by using a recognition code which is stored in the recognition code areas on the optical and the floppy disks.

There are two methods for storing the recognition code on the optical and floppy disks. In the first method, after checking to see that no data is stored in the recognition code areas of both the optical disk and the floppy disk, the same recognition code is stored into these areas. In the other method, a specific recognition code is pre-stored in the recognition code area of the optical disk at the factory. When the apparatus is used, the recognition code is stored in the recognition code area of the floppy disk after it has been confirmed that no data is stored in this area.

In the former method, an operator may, through a simple slip of memory, store the same recognition code on different optical disks. In the latter method, an operator may store the same recognition code on different floppy disks. This means that there are two or more floppy disks which correspond to one optical disk. Thus, for the conventional filing apparatus, it is difficult to secure a one-to-one correspondence of an optical disk and a floppy disk.

SUMMARY OF THE INVENTION

Accordingly, an object of the present invention is to provide an image information filing apparatus which can secure a one-to-one correspondence of a first storing medium for storing image information and a second storing medium for storing retrieval data which is individually matched to the image information.

To achieve the above object, an image information filing apparatus according to the present invention has a first storing medium provided with a recognition code area and a finish data area. In the recognition code area, a recognition code is prestored. A detecting means detects whether or not a finish data is stored in the first data area. The finish data indicates that the recognition data of the first storing medium is stored in the recognition area of a second storing medium. When the finish data is not stored, a memory control means has the recognition code of the first storing medium stored into the recognition code area of the second storing medium, and then the finish data stored into the finish data area of the first storing medium.

In this invention, the recognition code of the first storing medium is stored in the second storing medium, and then the finish data which indicates the completion of this action is stored in the first storing medium. This allows the first storing medium to correspond to the second storing medium in a one-to-one correspondence.

BRIEF DESCRIPTION OF THE DRAWINGS

By way of example and to make the reference clearer, reference is made to the accompanying drawings, in which:

FIG. 2 is a further detail block diagram illustrating a main control unit used in the embodiment of FIG. 1;

DETAILED DESCRIPTION OF THE PREFERRED EMBODIMENT

Figure 1:
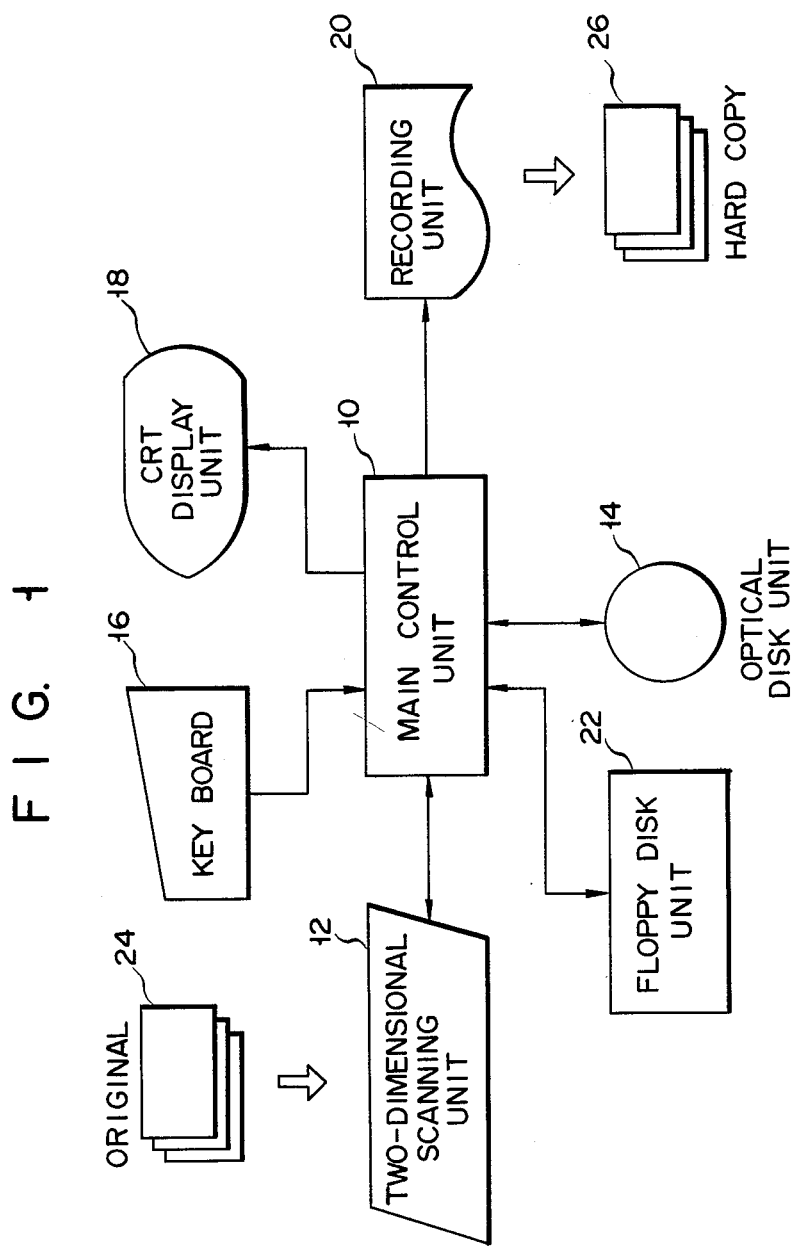
FIG. 1 is a schematic block diagram of an image information filing apparatus of an embodiment according to the present invention.

FIG. 1 is a schematic block diagram of an image information filing apparatus of an embodiment of the present invention.

A main control unit 10 is connected to a scanning unit 12, an optical disk unit 14, a keyboard 16, an output unit 18, a recording unit 20 and a floppy disk unit 22 and controls various image information processings which will be described later. The scanning unit 12 is composed of, for example, a two-dimensional scanner which scans an original (e.g. a document) 24 with a laser beam to generate an electric signal in response to the image information on the original 24. The optical disk unit 14 sequentially stores on an optical disk as a first storing medium the image information which is read out by the two-dimensional scanning unit 12 and supplied via the main control unit 10, and the index information produced by the main control unit 10. The keyboard 16 is used to key in various operational instructions and the retrieval codes individually assigned to the image information. The output unit 18, which may be, for example, a cathode ray tube (CRT) display unit, displays the image information which is read out by the two-dimensional scanning unit 12 and supplied via the main control unit 10 or displays the retrieval codes and the image information which is read out from the optical disk unit 14 and is supplied via the main control unit 10. The recording unit 20 outputs as hard copy the image information which is read out by the two-dimensional scanning unit and is supplied via the main control unit 10 or provides as hard copy the retrieval data and image information which are read out from the optical disk unit 14 and supplied via the main control unit 10. The floppy disk unit 22 stores on a floppy disk as a second storing medium, the retrieval data comprising a retrieval code inputted by the keyboard 23 and a memory address on the optical disk in which the image information corresponding to the retrieval code has been stored.

FIG. 2 is a block diagram showing further details of the maincontrol unit 10 in FIG. 1. In FIG. 2, like reference symbols designate like portions in FIG. 1.

Figure 3:
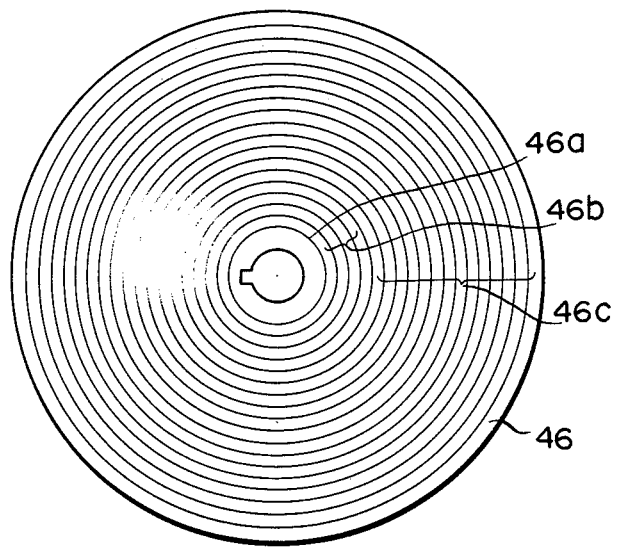
FIG. 3 is a schematic diagram of an optical disk used in the same embodiment.

The main control unit 10 comprises a CPU 30 for performing various controls, a main memory 32 for storing a program, a title memory 34 for storing retrieval data read out from or written into the floppy disk, a buffer memory 36 (e.g., page buffer) having a memory capacity sufficient to store at least image information of one unit (e.g., one page of the original), an encoding/decoding circuit 38 for encoding image information to reduce its redundancy and for decoding the encoded image information to restore the original redundancy, a pattern generator 40 for storing pattern information such as characters and symbols, and a display interface 42 for supplying data and control signals to the CRT display unit 18. The main memory 32 and keyboard 16 are connected to the CPU via a control bus CB. The other circuits are connected to the CPU via the control bus CB and data bus DB. The display interface 42 and the CRT display unit 18 may be considered to form the image information display unit. The floppy disk 44 in the floppy disk unit 22 is provided with a recognition code area 44a for storing a recognition code. The optical disk 46 in the optical disk unit 14 contains a finish data area 46a for storing the finish data on the innermost peripheral track, as shown in FIG. 3, after the recognition code has been stored in the recognition code area 44a on the floppy disk 44. A recognition code area 46b is provided over several tracks outward from the track of the finish data area 46a. In the recognition code area 46b, the recognition code has been previously stored during manufacture (e.g., serial numbers of products). The rest of the tracks outward from the recognition code area 46b form a data area 46c where image information is stored.

Figure 4:
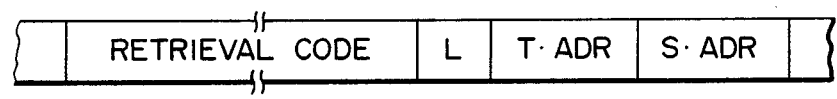
FIG. 4 is a view for showing a retrieval data structure used in the same embodiment.

FIG. 4 schematically shows a configuration of retrieval data. The retrieval data comprise, for example, 5-digit address information and a 20-digit retrieval code composed of as many as 6 items. One digit consists of, for example, 8 bits. The address information indicates the length L of image information (the number of sectors) by one digit, the address (the number of tracks) T.ADR of a track storing the image information by 2 digits and the address of a sector storing the image information by 2 digits.

Figure 5A:
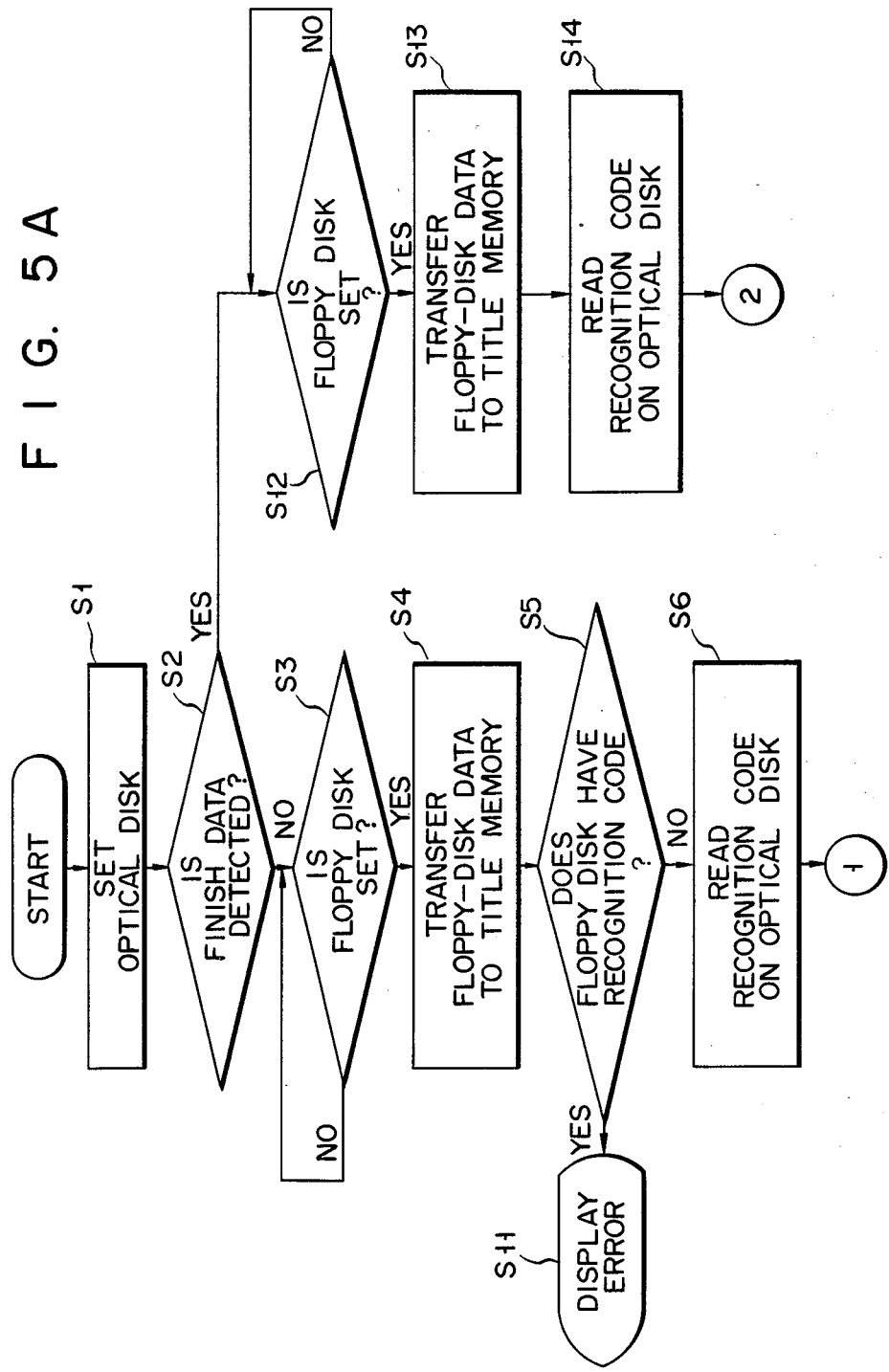
FIGS. 5A to 5B are flow charts for explaining the operation of the same embodiment.
Figure 5B:
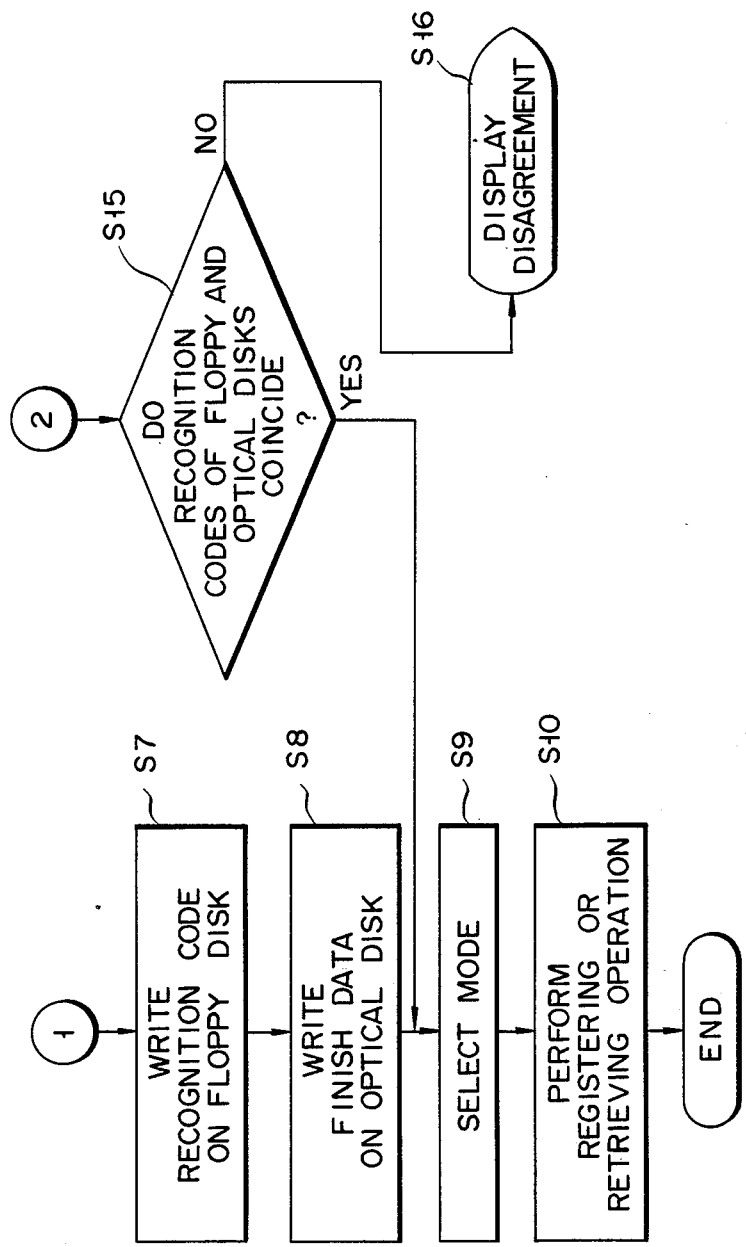

The operation of the embodiment thus arranged will be described referring to flow charts shown in FIGS. 5A and 5B.

Now, a power source (not shown) is turned on, the optical disk 46 with no stored image information is placed into the optical disk unit 14 (step S1) and the floppy disk 44 is also placed into the floppy disk unit 22. The CPU 30 then sends a control signal to the optical disk unit 14 to perform the focusing and positioning of an optical head (not illustrated). After this positioning, the optical disk unit 14 sets the optical head on the innermost track of the optical disk 46, i.e., the finish data area 46a, to read out the contents of this area 46a and send them to the CPU 30.

The CPU 30 judges whether or not the finish data has been stored by checking the contents of the finish data area 46a (step S2). When the finish data has not been stored, the CPU 30 checks whether or not the floppy disk 44 has been set in the floppy disk unit 22 (step S3). When the floppy disk 44 is not set, the CPU 30 repeats this step, and proceeds to the next step S4 when it is set.

In step S4, the CPU 30 reads out the contents stored in the floppy disk 44 and stores them in the title memory 34. Also, the CPU 30 judges whether or not the recognition code has been contained in the contents of the floppy disk 44 stored in the title memory 34 (step S5).

In step S5, when the recognition code is found that the CPU 30 supplies error data to the display interface 42 to cause the CRT display unit 18 to display an error (step S11). When the recognition code is not found in the contents of the floppy disk 44, the CPU 30 reads out the recognition code from the recognition code area 46b of the optical disk 46 (step S6), stores this recognition code in the recognition code area 44a on the floppy disk 44 (step S7), and then stores the finish data in the finish data area 46a (step S8). After the completion of step S8, the optical disk 46 corresponds to the floppy disk 44 in a one-to-one correspondence. The completion of step S8 is announced to an operator by an appropriate method such as a lamp indication. With the help of this indication, the operator then selects a registration mode with the keyboard 16 (step S9), and inputs the retrieval code of the image information to be registered.

Based on this retrieval code, the CPU 30 performs the registration processing (step S10). Specifically, the CPU 30 checks whether or not the input data corresponds to the format of the retrieval code as previously defined. In this step, the number of digits and kinds of characters, etc., are checked. The CPU 30 also collates the input retrieval code with those already registered, and checks whether or not they may cause double registration. When a retrieval code is judged to be correct, it is stored in the title memory 34.

When the inputted retrieval code is correct, it is announced to the operator by an appropriate method such as a lamp indication. When the operator sets an original in the two-dimensional scanning unit, the CPU 30 starts to operate the optical disk unit 14 and the two-dimensional scanning unit 12.

The two-dimensional scanning unit 12 optically scans the image information of a document in a two-dimensional method, and converts this image information into electric signals. This photoelectrically converted line information is sequentially stored in the page buffer 36. When the image information of one page is stored in this page buffer 36, it is transferred to the display interface 42, and is then displayed on the CRT display unit 18.

When the image displayed on the CRT display unit 18 is correct, the operator depresses a recording key on the keyboard 16 (not shown). The CPU 30 then outputs control signals so that the one page image information stored on the page buffer 30 is sent to the encoding/decoding circuit 38 for every line information. The encoding/decoding circuit 38 performs the band compression of the inputted line information by a wellknown Modified Huffman (MH) conversion, and supplies it to the optical disk unit 14, which stores the supplied image information on the optical disk 46.

When the recording of this image information is finished, the CPU 30 causes the memory address composed of the track number, the start sector and the image length to correspond to the retrieval code and to be stored in the title memory 34. The track number and the start sector indicate where the image information has been stored on the optical disk. Next, the CPU 30 has the retrieval data stored in the title memory 34, i.e., the retrieval code, the track number, the start sector number, and the image length supplied to the floppy disk unit 22. The floppy disk unit 22 then stores the supplied retrieval data on the floppy disk 44. The other image information is also processed in the same manner, and stored on the optical disk 46.

The retrieval of the image information registered as described above will now be explained. The operator selects a retrieval mode with the keyboard 16, and keys in a retrieval code. The CPU 30 then sequentially collates the retrieval code with the retrieval codes stored in the title memory 34, and checks whether or not one of the retrieval codes in the title memory coincide with the inputted retrieval code. When the coincident retrieval code exists, the CPU 30 retrieves the corresponding track number and the start sector number, and outputs an instruction to reproduce the corresponding image information to the optical disk unit 14.

Then, the optical disk unit 14 supplies the encoded image information to the encoding/decoding circuit 38 for every scanning line. The encoding/decoding circuit 38 performs the band decoding (band expanding) by MH inverse transformation to return the encoded image information to the original image information, and sequentially supplies it to the page buffer 36. When the image information corresponding to the amount of one page is stored in the page buffer 36, the CPU 30 has the image information in the page buffer displayed on the screen of the CRT display unit 18 through the display interface 42, or produced as hard copy 26 by the recording unit 20. The retrieval of the other image information is performed in the same manner. In step S2, when the CPU 30 checks the contents of the finish data area and finds that the finish data is stored, it first ascertains that the floppy disk is set in the floppy disk unit (step S12), then reads out the contents of the floppy disk 44, and stores them in the title memory 34 (step S13).

Then, the CPU 30 reads out the recognition code from the recognition code area 46 in the optical disk 46b (step S14) and compares this recognition code with that of the recognition area 44a on the floppy disk 44 (step S15). When these do not coincide, the CPU supplies error data to the display interface 42, causing the CRT display unit 18 to perform an error display (step S16). When, in step S15, the recognition code of the optical disk 46 coincides with that of the floppy disk 44, the CPU proceeds to step S9. The registration and retrieval operations are then performed.

As described above, according to the present invention, there is no possibility of matching different floppy disks to the same optical disk, securing a one-to-one correspondence of the optical disk and the floppy disk.

It should be understood that the present invention is not limited to the above-mentioned embodiment. In the embodiment, the serial numbers of products are used as a recognition code for the optical disk but a combination of the material of the optical disk, the track pitch, and the depth of the groove may be used for the recognition code.

It should further be understood that the present invention may be variously modified and changed within the spirit of the invention.

What is claimed is:

1. A method comprising the steps of:
    (1) determining whether a finish data storing area defined by a first storing medium contains finish data;
    (2) reading a recognition code from a first recognition code storing area defined by said first storing medium;
    (3) if said determining step (1) determines that said finish data storing area contains no finish data, performing the steps of:
        (a) writing the recognition code read by said reading step (2) into a second recognition code storing area defined by a second storing medium different from said first storing medium, and
        (b) writing finish data into said finish data storing area;
    (4) if said determining step (1) determines that said finish data storing area does contain finish data, performing the steps of:
        (a) reading a recognition code from said second recognition code storing area, and
        (b) determining whether said recognition code read by said reading step (2) is equal to said recognition code read by said reading step (4)(a); and
    (5) subsequent to either of said steps (3) and (4), and provided that said determining step (4)(b) does not determine said read recognition codes are unequal, reading information from and/or writing image information into an image information storing area defined by said first storing medium at least partially in response to retrieval information stored in a retrieval information storing area defined by said second storing medium.

2. A method as in claim 1 further comprising the steps of:
    (x) if said determining step (1) determines that said finish data storing area contains no finish data, determining if said second recognition code storing area contains a recognition code;
    (y) subsequent to said determining step (x), displaying first indicia of error if said determining step (1) determines that said finish data storing area does not contain finish data and said determining step (x) determines that a recognition code is stored in said second recognition code storing area; and
    displaying second indicia of error if said determining step (4)(b) determines that said read recognition codes are not equal.

3. A method as in claim 1 wherein:
    said determining step (1) includes the step of reading information from the innermost of a plurality of substantially circular and concentric tracks defined on a first surface of an optical disk, said first storing medium comprising said optical disk;
    said reading step (2) comprises the step of reading information from at least another one of said plurality of tracks different from and surrounding said innermost track; and
    said reading and/or writing step (5) includes the step of reading information from and/or writing information into at least one of said plurality of tracks different from said innermost and another tracks.

4. An apparatus for filing image information comprising:
    first storing means for storing image information, said first storing means including means for defining:
        an image information storing area for storing image information,
        a first recognition code storing area for storing a recognition code, said first recognition code storing area being initialized with a predetermined recognition code, and a finish data storing area for storing finish data;

second storing means for identifying image information stored in said image information storing area of said first storing means, said second storing means including means for defining:

a second recognition code storing area for storing a recognition code, and a retrieval information storing area for storing information identifying image information stored in said image information storing area of said first storing means;

first storing medium access means, adapted to receive said first storing means, for selectively reading image information from and writing information into said image information storing area, for selectively reading said recognition code from said first recognition code storing area, and for selectively reading information from and writing information into said finish data storing area;

second storing medium access means, operatively connected to said second storing means, for selectively reading information from and writing information into said retrieval data storing area and for selectively reading information from and writing information into said second recognition code storing area; and control means, operatively connected to said first and second storing medium access means, for:

(1) controlling said first storing medium access means to read the contents of the finish data storing area, (2) determining, in response to the read contents of said finish data storing area, whether the finish data storing area contains finish data, (3) controlling said first storing medium access means to read said predetermined recognition code from the first recognition code storing area, (4) if said finish data storing area contains no finish data, writing the recognition code read from said first recognition code storing area into the second recognition code storing area and writing finish data into said finish data storing area, (5) if the determination in response to said read contents of said finish data storing area is that said finish data storing area contains finish data, controlling said second storing medium access means to read a recognition code from said second recognition code storing area and determining whether the read recognition code from said second recognition code storing area is equal to the read recognition code of the first recognition code storing area, and (6) reading image information from and/or writing image information into said image information storing area at least partially in response to information stored in said retrieval information storing area only if the recognition code stored in said first recognition code storing area is equal to the recognition code stored in said second recognition code storing area.

5. An apparatus as in claim 4 wherein:

said control means also:

controls said second storing medium access means to read the contents of said second recognition code storing area whenever said control means determines that said finish data storing area contains no finish data, produces first indicia of error when said finish data storing area does not contain finish data and said second recognition code storing area of said second storing medium does contain a recognition code, and produces second indicia of error when the recognition code read from the first recognition code storing area is not equal to the recognition code read from said second recognition code storing area; and said apparatus further includes display means, operatively connected to said control means, for displaying said first and second indicia of error.

6. An apparatus as in claim 4 wherein said first storing means comprises an optical disk and said first storing medium access means comprises an optical disk access unit.

7. An apparatus as in claim 6 wherein:

said optical disk includes means for defining a plurality of substantially circular substantially concentric tracks on a first surface thereof;

said finish data storing area comprises a first, innermost one of said plurality of tracks;

said first recognition code storing area comprises at least a second one of said plurality of tracks outside said first track; and said image information storing area comprises at least a third of said plurality of tracks different from said first and said second tracks and outside said second track.

8. An apparatus as in claim 4 wherein said second storing means comprises a floppy disk and said second storing medium access means comprises a floppy disk access unit.

* * * * *

UNITED STATES PATENT AND TRADEMARK OFFICE
CERTIFICATE OF CORRECTION

PATENT NO. : 4,555,803
DATED : November 26, 1985
INVENTOR(S) : Kenji Hirose

It is certified that error appears in the above-identified patent and that said Letters Patent is hereby corrected as shown below:

ON THE FIRST INFORMATION PAGE:

Please change "[30] Foreign Application Priority Data

Apr. 2, 1982 [JP] Japan.....54-55142" to

--[30] Foreign Application Priority Data

Apr. 2, 1982 [JP] Japan.....57-55142--.

Signed and Sealed this

Twenty-second Day of April 1986

[SEAL]

Attest:

DONALD J. QUIGG

Attesting Officer     Commissioner of Patents and Trademarks